3,041,296
POLYURETHANE COMPOSITION CONTAINING LITHIUM PHOSPHATE AND CHLORINATED PHOSPHATE ESTER
William Lindlaw, Westfield, and Edward J. Hensch, Fords, N.J., assignors to Celanese Corporation of America, New York, N.Y., a corporation of Delaware
No Drawing. Filed Apr. 8, 1959, Ser. No. 804,837
8 Claims. (Cl. 260—2.5)

This invention relates to polyurethane compositions containing a chlorinated phosphate ester and a lithium containing compound.

Polyurethanes are high molecular weight compounds containing a plurality of urethane or analogous linkages. One such group of compounds which are coming into large scale commercial use at the present time are the so-called polyurethane foams.

Polyurethane foams are generally formed from compositions which include a polymer containing free hydroxy groups, such as hydroxyl terminated polyester or polyether, an organic diisocyanate, and a small amount of water. For best results, a catalyst, preferably an amine catalyst, and an emulsifier are also included. Such compositions may be foamed and otherwise treated in a manner known in the art to produce the desired flexible porous product.

When the reaction is carried out under suitable conditions, a portion of the diisocyanate reacts with the hydroxyl groups in the polyester or polyether to form a cross-linked polymer, while another portion of the diisocyanate reacts with water, liberating carbon dioxide which converts the polymer to a foam. Depending upon the relative proportions of the ingredients, the method of mixing, and other precise conditions, the foams may range from soft and highly flexible materials to stiff, rigid materials. Related polyurethanes may be prepared under such conditions that no foam is generated and have been found useful as ingredients in coatings and elastomers.

The polyester may be derived from a reaction product of a dicarboxylic acid such as adipic acid and a dihydric alcohol such as diethylene glycol, and may be modified with a polyhydroxy compound such as trimethylol propane. Other polyesters, known in the art may be used in the same manner.

Typical polyethers are also known in the art. One of those which may be used is polyoxypropylene glycol, having a molecular weight of 2000 to 3000. The diisocyanate may be a tolylene diisocyanate and the catalyst may be of the amine type such as N-methyl morpholine.

The production of these polyurethane polymers is known in the art and does not, in itself, form a part of the present invention. Examples of the production of such polyurethane foams are given in the articles in "Modern Plastics," April 1954, page 143; "Modern Plastics," August 1955, page 102; "British Plastics," January 1956, page 5; and in the patent and other references referred to in these articles.

While the polyurethane foams have many desirable properties, they are flammable which limits their applicability. It has been proposed to reduce the flammability by incorporating into such polyurethanes a chlorinated phosphate ester. While this greatly reduces or even eliminates the flammability of the foam, it has been found that when the phosphate ester-containing product is exposed for an extended period of time to a high humidity at an elevated temperature, there is a tendency for the foam to exhibit a considerable degree of breakdown as evidenced by its discoloration, loss in strength and flexibility, and even by its crumbling and disintegration. This has heretofore limited the utility of the phosphate ester as an additive to the polyurethane foams.

In application Ser. No. 636,242, filed January 25, 1957, by George H. Wiech and Raymond A. Dragon, it has been proposed to reduce the breakdown of the foam by the addition thereto of a lithium containing compounds, such as lithium carbonate, lithium hydroxide or lithium recinioleate, wtih lithium carbonate being preferred.

According to the present invention, it has been found that polyurethanes containing chlorinated phosphate esters may be stabilized completely by the addition of a particular class of lithium compound, namely the lithium salts of acids having a dissociation constant not lower than about $1 \times 10^{-2}$ at 18° C. By the use of these lithium compounds and particularly lithium phosphate, the humidity aging resistance of a polyurethane is not only restored to its original value (value in the absence of the chlorinated phosphate ester) but in many cases enhanced to better than its original value. The products obtained in this manner show all the desirable properties of conventional polyurethanes, are non-flammable and retain their properties for extended periods of time even when exposed to high humidities at elevated temperatures.

In putting this invention into practice, the polyurethane foams may be prepared in conventional manner. For example, the polyester containing free hydroxyl groups and the diisocyanate may be mixed together to form a prepolymer to which may be added the desired proportion of chlorinated phosphate ester. This prepolymer may then be mixed with an aqueous emulsion, containing water, catalyst and generally an emulsifier. The lithium phosphate, in finely divided state, is blended with either the prepolymer or the aqueous emulsion before the blending of the two. The mixing of the prepolymer and aqueous emulsion is best carried out in a foam machine which will control the rate and manner of mixing and which will also shape the foam to give a product of the desired form. Many suitable machines for this purpose are available. Examples of such machines may be found in the articles referred to above.

The proportion of chlorinated phosphate ester which is incorporated into the polyurethane should be at least 3% by weight on the total weight of the product to give a foam having a suitably low degree of flammability. Preferably the phosphate ester is incorporated in proportions between about 3% and 15% by weight. The phosphate ester has been found not only to lower the flammability of the polyurethane foams, but also to improve their processing whereby a product having a more uniform cell structure is obtained. The phosphate esters employed have chlorine linked to aliphatic carbon atoms. Examples of such esters are chloroalkyl phosphates such as tris(beta-chlorethyl)-phosphate and tris-dichloropropyl phosphate and similar single and mixed lower aliphatic esters. The phosphate esters are advantageously incorporated into the prepolymer as described above.

The proportion of lithium phosphate should be sufficient to give the final product a lithium content of at least .02% by weight and preferably from 0.1 to 0.5% by weight. When the lithium phosphate is incorporated in the chlorinated phosphate ester, it may be dispersed by grinding it in a paint mill from about 1.1 to about 2.0 parts by weight of chlorinated phosphate ester per part of lithium phosphate to produce a paste followed by blending of the paste with the remainder of the chlorinated phosphate ester to produce a final suspension having from about 5 to 100 parts of ester per part of lithium phosphate. Preferably, a surface active agent, such as N-alkyl-α-hydroxy-butyramide (described in detail in U.S. Patent 2,872,332 of Grifo and Mayhew, February 3, 1959), is included in an amount between about 1 and 3% by weight, based on the weight of chlorinated phosphate ester.

When the lithium phosphate is incorporated in the aqueous emulsion, it may also be dispersed by grinding with a portion of the water followed by blending with the remainder.

The presence of the lithium phosphate prevents the accelerated breakdown of the polyurethane caused by the presence of the chlorine containing phosphate ester when the polyurethane is exposed at high humidities to an elevated temperature. A test for determining the extent of breakdown has been proposed in the Humidity Aging Text (Proposed Tentative Specifications of Methods of Test for Flexible Urethane Foam, The Society of the Plastics Industry, Inc., June 4, 1956), according to which samples are exposed for a period of seven days at temperature of 158° F.±2° F. to a relative humidity of 95 to 100%. Surprisingly enough, many other stabilizers that have been suggested for incorporation into polymeric compositions have not proved effective in preventing the breakdown of polyurethane foams when employed in combination with chlorinated phosphate esters.

The following examples are given to illustrate this invention further:

EXAMPLES I TO IV

Formulations were prepared for conversion into polyurethane foams, as follows:

Table No. 1

|  | Parts by weight | | | |
|---|---|---|---|---|
|  | I | II | III | IV |
| Polyester | 750 | 750 | 750 | 750 |
| Tolylene diisocyanate | 300 | 300 | 300 | 300 |
| Witco 77–86 (emulsifier) | 15 | 15 | 15 | 15 |
| N-Methyl morpholine | 15 | 15 | 15 | 15 |
| Water | 30 | 30 | 30 | 30 |
| Tris-(β-chloroethyl)-phosphate | | 52 | 52 | 52 |
| Lithium carbonate | | | 5.2 | |
| Lithium phosphate | | | | 5.2 |

The polyester used was a polyester of diethylene glycol and adipic acid, modified with a minor amount of trimethylol propane, and having an average molecular weight of about 2000. The tolylene diisocyanate used was a liquid mixture of 2,4 and 2,6 isomers, in the proportion of about 80% of the former and 20% of the latter. Witco 77–86, the emulsifier, is a light amber clear liquid consisting of a balanced blend of polyhydroxy alcohols incompletely esterified with higher fatty acids and partially esterified with dicarboxylic acids. It has a specific gravity of 1.00 to 1.02, an acid number from 12 to 16, a pH of 3.0 to 4.0 in a 3% aqueous dispersion and is soluble in polyesters used in the preparation of polyurethane foams and in aromatic and chlorinated solvents. It is dispersible in water and insoluble in kerosene.

The lithium phosphate of Example IV was incorporated in the chlorinated phosphate ester with the addition of 0.93 part by weight on N-alkyl-α-hydroxybutyramide. The lithium phosphate was ground in a 3 roll paint mill together with 7 parts of the chlorinated phosphate ester and the N-alkyl-α-hydroxybutyramide was dissolved in the remainder by heating the mixture to 70° C. and then permitting the mixture to cool and gel. The two portions were then combined.

The lithium carbonate of Example III was incorporated by blending the dry powder into the aqueous phase.

In the preparation of the foams, the polyester and tolylene diisocyanate were admixed and then the tris-(β-chloroethyl)-phosphate was added. The water, emulsifier and N-methyl morpholine were admixed to form an aqueous emulsion. The polyester admixture and the aqueous emulsion were simultaneously slowly fed at room temperature to a mixing vessel over a period of one minute with constant stirring. The properties of the foams are shown in the following table.

Table No. 2

|  | I | II | III | IV |
|---|---|---|---|---|
| Density, lbs./cu. ft. | 2.36 | 2.36 | 2.35 | 2.58 |
| Compression, p.s.i.[a,c] | 0.69 | 0.65 | 0.47 | 0.81 |
| Compression p.s.i.[b,c] | 0.76 | 0.54 | 0.49 | 0.96 |
| Percent Compression Load Deflection (Loss or gain) | +10.1 | −16.9 | +4.3 | +21.0 |
| Percent Compression Set [a,d] | 6.75 | 6.85 | 14.42 | 4.30 |
| Percent Compression Set [b,d] | 8.98 | 28.15 | 17.10 | 6.62 |

[a] Before aging.
[b] After aging in an atmosphere of 100% relative humidity at 158° F. for two weeks.
[c] Load necessary for a 25% deflection.
[d] Permanent set after constant deflection to 50% of original height for 22 hours at 158° F.

It may be seen that the addition of the chlorinated phosphate ester increases the susceptibility of the polyurethane foam to softening after humidity aging. The addition of lithium carbonate results in resistance to humidity aging but produces a softer foam. The addition of lithium phosphate, on the other hand, produces a foam of greater stiffness than the original foam without the chlorinated phosphate ester.

EXAMPLE V

The procedure of Example IV was repeated, except that the lithium phosphate was incorporated into the aqueous emulsion by grinding it into a paste in with 10 parts of the water and then dispersing the paste in an admixture of the remainder of the water, the N-methyl morpholine and a polyoxyethylene derivative of sorbitan monopalmitate (containing 65% by weight of oxyethylene units), which was substituted for the Witco 77–86 as an emulsifier on an equivalent weight basis. The polyester in this case was the condensation product of adipic acid with 51 mol percent of diethylene glycol and 2 mol percent of trimethylol propane and had an average molecular weight of about 2000.

A flameproof polyurethane foam was produced which had excellent resistance to humidity aging.

It is to be understood that the foregoing detailed description is merely given by way of illustration and that many variations may be made therein without departing from the spirit of our invention.

Having described our invention what we desire to secure by Letters Patent is:

1. A polyurethane foam containing a chlorinated phosphate ester as a flammability-reducing agent, said foam containing lithium phosphate as a stabilizer against breakdown on aging at high humidity resulting from the presence of said chlorinated phosphate ester.

2. In a polyurethane composition containing a chlorinated phosphate ester as a flame retardant plasticizer, the improvement which comprises the inclusion of a sufficient amount of a lithium salt of phosphoric acid to stabilize the composition against humidity aging.

3. The composition of claim 2 wherein said lithium solution is lithium phosphate.

4. The composition of claim 3 wherein said polyurethane is a polyurethane foam.

5. In a polyurethane composition containing between 5 and 10% by weight of a chlorinated phosphate ester as a flame retardant plasticizer, the improvement which comprises the inclusion of a sufficient amount of lithium phosphate to stabilize the composition against humidity aging, said amount being sufficient to give a lithium content of at least 0.02% by weight.

6. The composition of claim 5 wherein the said amount of lithium phosphate is sufficient to give a lithium content of between 0.1 and 0.5% by weight.

7. The composition of claim 2 wherein said chlorinated phosphate ester has chlorine linked to an aliphatic carbon atom.

8. The composition of claim 7 wherein said phosphate ester is a chlorinated lower aliphatic phosphate ester.

References Cited in the file of this patent

UNITED STATES PATENTS

| | | |
|---|---|---|
| 2,634,244 | Simon et al. | Apr. 7, 1953 |
| 2,894,919 | Simon et al. | July 14, 1959 |